US012671143B2

(12) United States Patent
Kim et al.

(10) Patent No.: US 12,671,143 B2
(45) Date of Patent: Jun. 30, 2026

(54) SEPARATOR WITH ORGANIC/INORGANIC POROUS COATING LAYER FOR ELECTROCHEMICAL DEVICE, AND ELECTROCHEMICAL DEVICE INCLUDING SAME

(71) Applicant: LG ENERGY SOLUTION, LTD., Seoul (KR)

(72) Inventors: Min Ji Kim, Daejeon (KR); Seung Hyun Lee, Daejeon (KR); Hye Won Kim, Daejeon (KR); Kyung Ryun Ka, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 0 days.

(21) Appl. No.: 19/312,569

(22) Filed: Aug. 28, 2025

(65) Prior Publication Data

US 2025/0391999 A1     Dec. 25, 2025

Related U.S. Application Data

(63) Continuation of application No. 17/976,136, filed on Oct. 28, 2022, now Pat. No. 12,431,585.

(30) Foreign Application Priority Data

| Oct. 29, 2021 | (KR) | ........................ 10-2021-0147362 |
| Oct. 18, 2022 | (KR) | ........................ 10-2022-0134358 |
| Oct. 18, 2022 | (WO) | ................ PCT/KR2022/015890 |

(51) Int. Cl.
H01M 50/414 (2021.01)
H01M 50/431 (2021.01)

(52) U.S. Cl.
CPC ....... H01M 50/414 (2021.01); H01M 50/431 (2021.01)

(58) Field of Classification Search
CPC ......................... H01M 50/414; H01M 50/431
See application file for complete search history.

(56) References Cited

U.S. PATENT DOCUMENTS

| 2011/0259505 A1 | 10/2011 | Lee et al. |
| 2016/0215106 A1 | 7/2016 | Jeong et al. |
| (Continued) | | |

FOREIGN PATENT DOCUMENTS

| CN | 1851957 A | 10/2006 |
| CN | 109509857 A | 3/2019 |
| (Continued) | | |

OTHER PUBLICATIONS

Extended European Search Report for European Application No. 22887467.3, dated Sep. 20, 2024.

*Primary Examiner* — Helen Oi K Conley
(74) *Attorney, Agent, or Firm* — Birch, Stewart, Kolasch & Birch, LLP

(57)     ABSTRACT

A separator for an electrochemical device, in which the separator includes a separator substrate and an organic-inorganic composite porous coating layer on at least one surface of the separator substrate. The separator substrate is a porous film including a polyolefin-containing polymer. The organic-inorganic composite porous coating layer includes a polymer resin particles and inorganic particles, in which each particle of the polymer resin particles includes a polyvinylidene fluoride (PVDF)-containing polymer and an acrylic polymer, and the PVDF-containing polymer has a Hansen solubility parameter (HSP) value of 13 or less and 1 or more.

11 Claims, 9 Drawing Sheets

(56) References Cited

U.S. PATENT DOCUMENTS

| | | |
|---|---|---|
| 2020/0203762 A1 | 6/2020 | Park et al. |
| 2021/0057698 A1 | 2/2021 | Sung et al. |
| 2021/0135316 A1 | 5/2021 | Sung et al. |
| 2022/0025205 A1 | 1/2022 | Hidalgo et al. |

FOREIGN PATENT DOCUMENTS

| | | | |
|---|---|---|---|
| CN | 109659589 A | 4/2019 | |
| EP | 3 490 032 A1 | 5/2019 | |
| EP | 4 030 545 A1 | 7/2022 | |
| JP | 2004200010 A * | 7/2004 | ............ Y02E 60/10 |
| JP | 2012-182012 A | 9/2012 | |
| JP | 2016-115593 A | 6/2016 | |
| JP | 2018-163872 A | 10/2018 | |
| JP | 2019-29314 A | 2/2019 | |
| JP | 2019-525442 A | 9/2019 | |
| KR | 10-2011-0035847 A | 4/2011 | |
| KR | 10-1462110 B1 | 11/2014 | |
| KR | 10-2014-0147742 A | 12/2014 | |
| KR | 10-2015-0106818 A | 9/2015 | |
| KR | 10-2016-0127473 A | 11/2016 | |
| KR | 10-2016-0128726 A | 11/2016 | |
| KR | 10-2016-0130715 A | 11/2016 | |
| KR | 10-2016-0136089 A | 11/2016 | |
| KR | 10-1729843 B1 | 4/2017 | |
| KR | 10-2017-0103208 A | 9/2017 | |
| KR | 10-2019-0012123 A | 2/2019 | |
| KR | 10-2019-0083910 A | 7/2019 | |
| KR | 10-2019-0128136 A | 11/2019 | |
| KR | 10-2019473 B1 | 11/2019 | |
| KR | 10-2020-0009012 A | 1/2020 | |
| KR | 10-2020-0020644 A | 2/2020 | |
| KR | 10-2020-0036648 A | 4/2020 | |
| KR | 10-2020-0056337 A | 5/2020 | |
| KR | 10-2021-0053035 A | 5/2021 | |
| KR | 10-2258088 B1 | 5/2021 | |
| KR | 10-2021-0096647 A | 8/2021 | |
| WO | WO 2014/083988 A1 | 6/2014 | |
| WO | WO 2014/147888 A1 | 9/2014 | |
| WO | WO 2017/026485 A1 | 2/2017 | |
| WO | WO 2017/195564 A1 | 11/2017 | |
| WO | WO 2020/263936 A1 | 12/2020 | |
| WO | WO 2022/200724 A1 | 9/2022 | |

* cited by examiner

[FIG. 1]
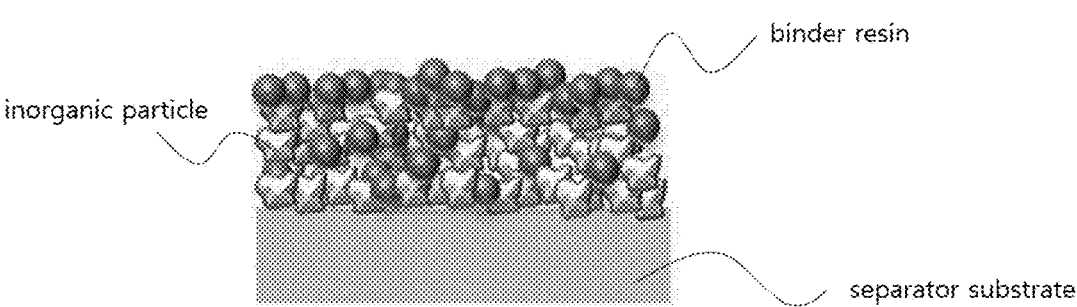

[FIG. 2A]
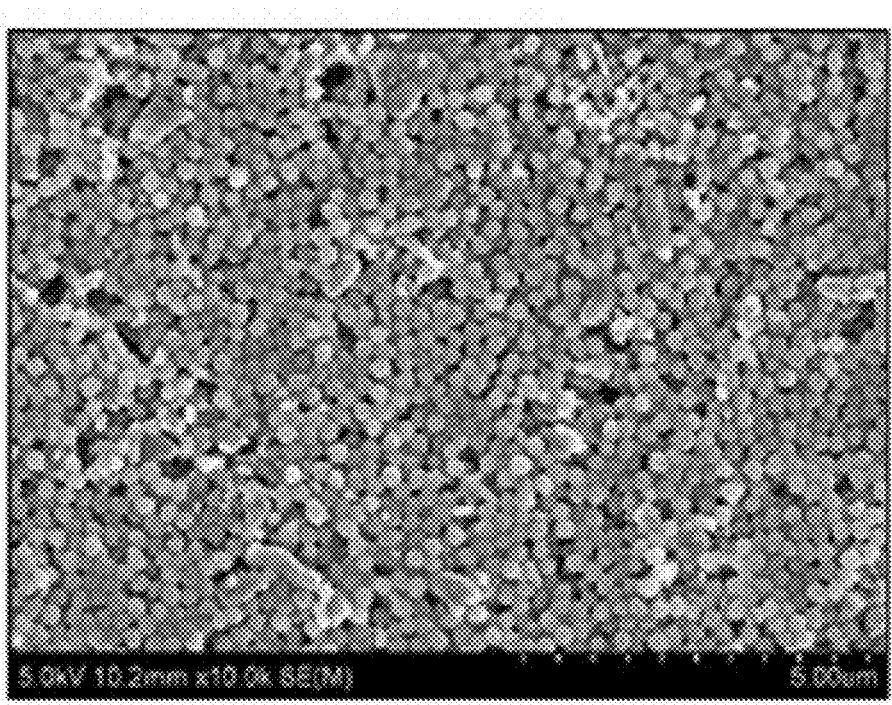

[FIG. 2B]
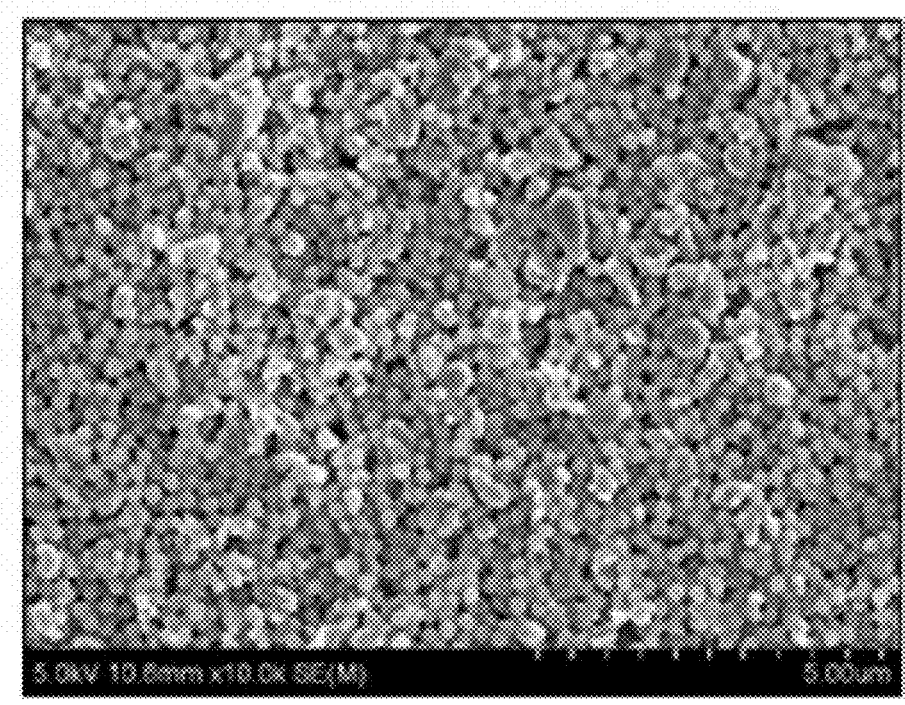

[FIG. 3A]
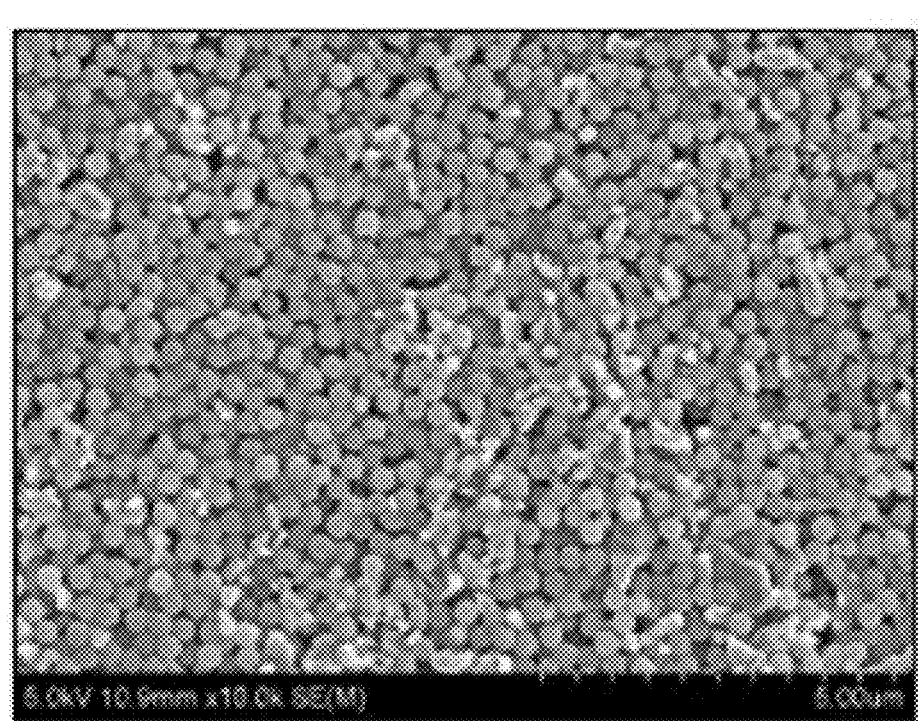

[FIG. 3B]
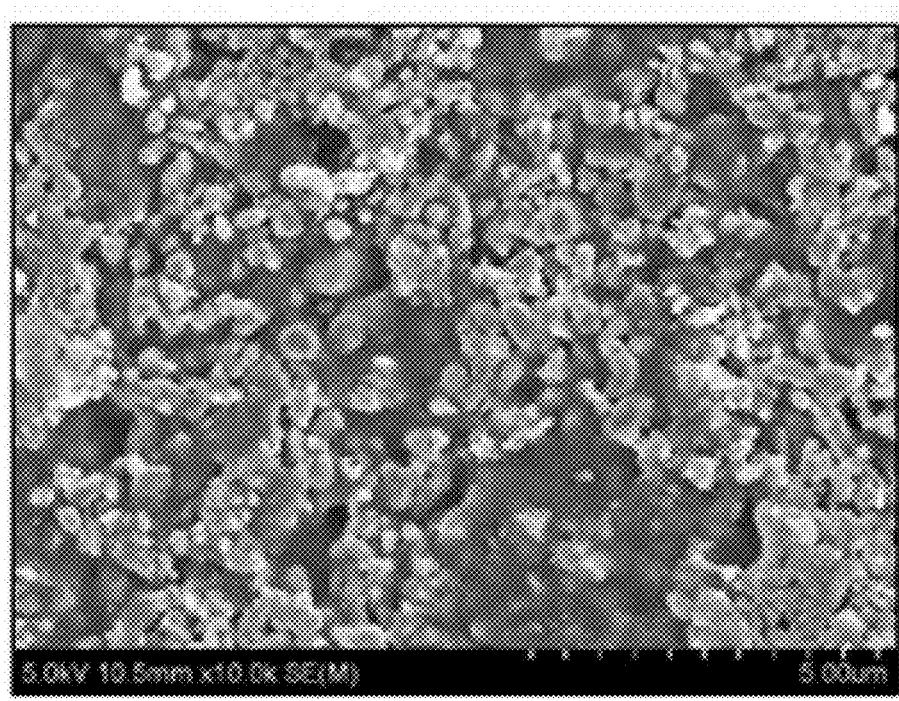

[FIG. 4A]
100
121
110
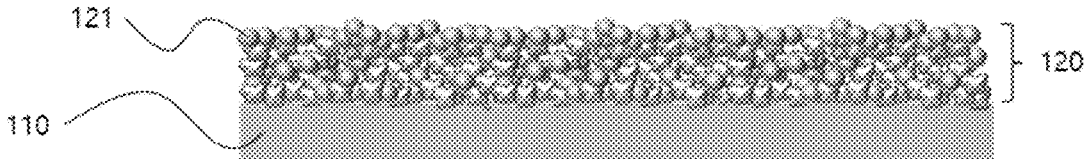
120
[FIG.4B]
100
121
110
121
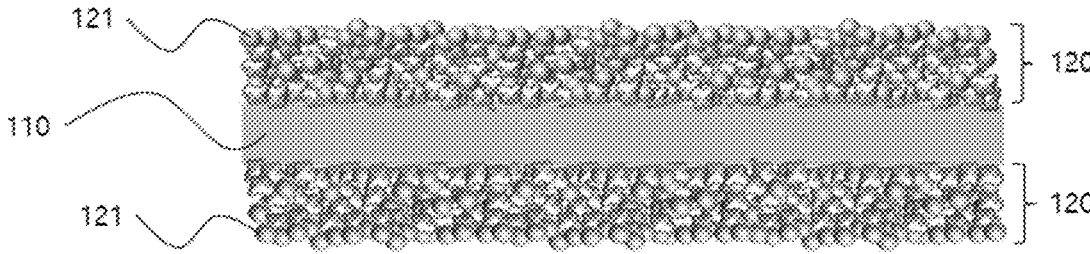
120
120

[FIG.5A]
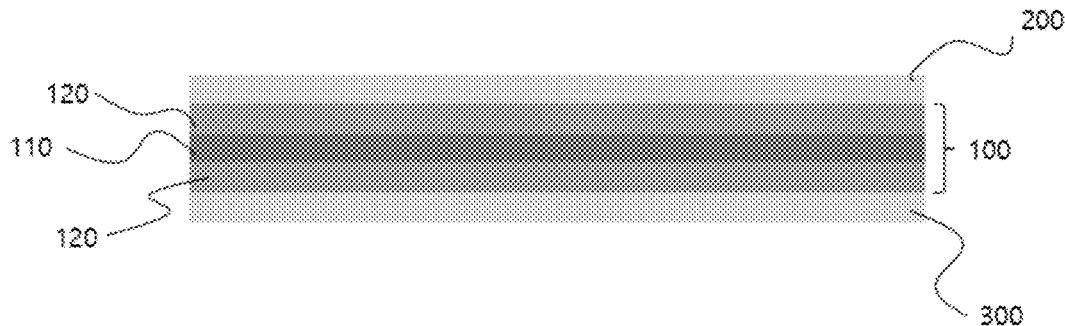
[FIG.5B]
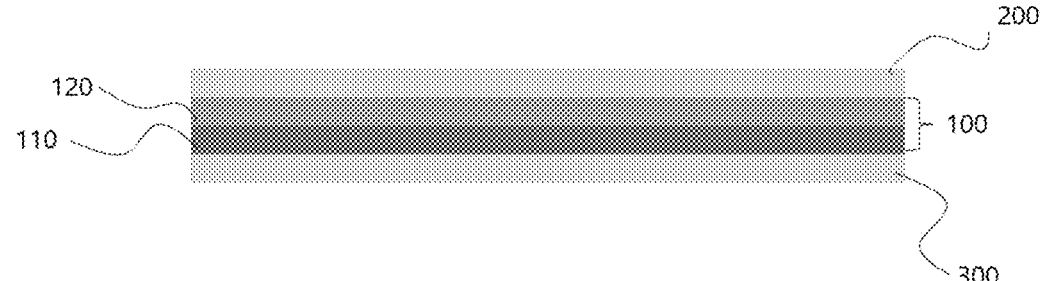
[FIG.5C]
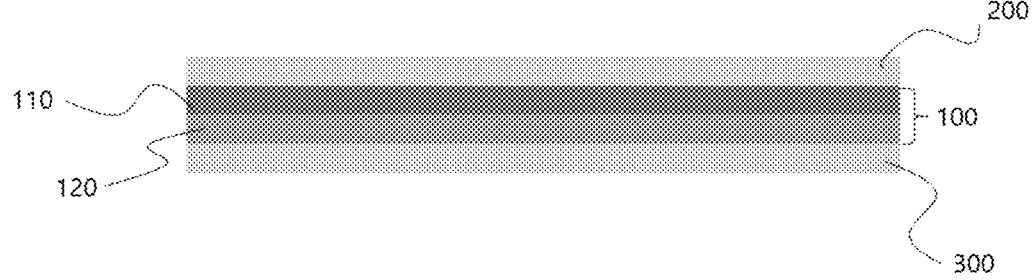

[FIG.6A]
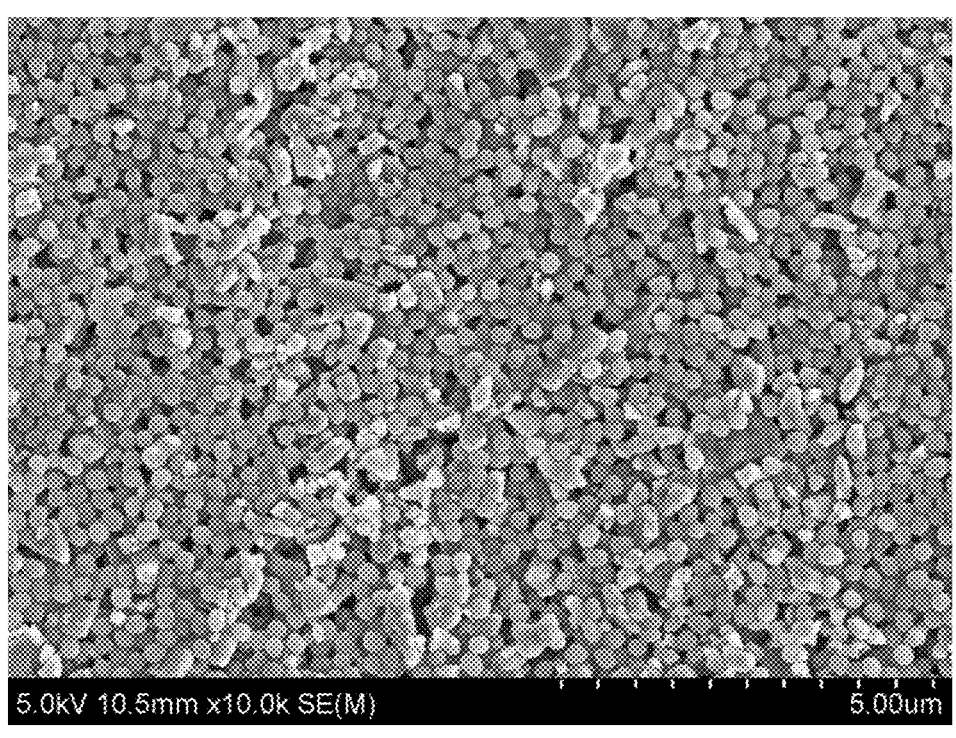

[FIG.6B]
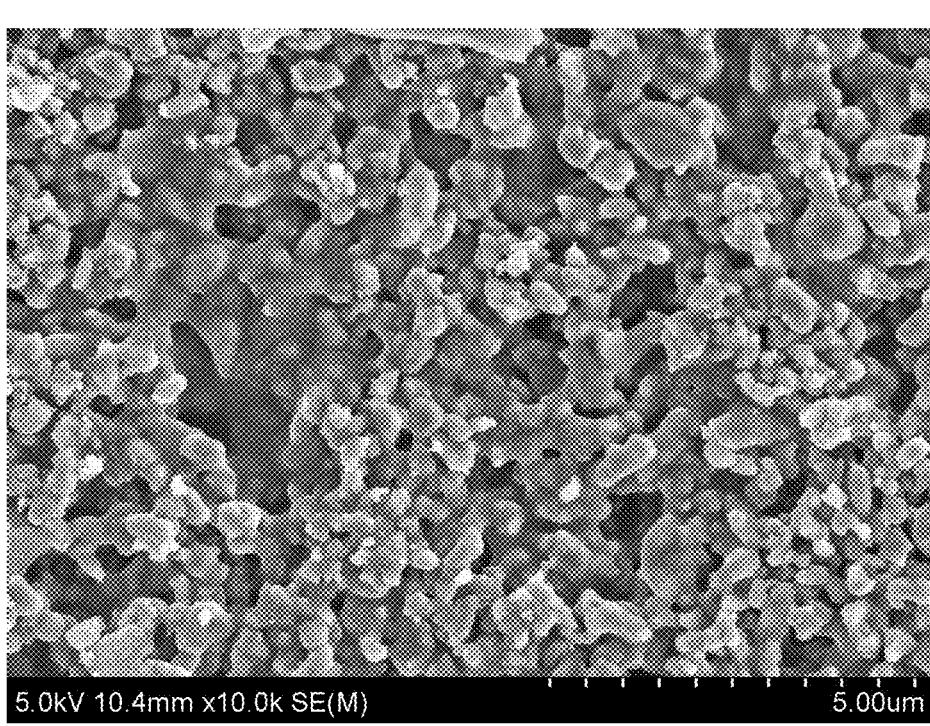

SEPARATOR WITH ORGANIC/INORGANIC POROUS COATING LAYER FOR ELECTROCHEMICAL DEVICE, AND ELECTROCHEMICAL DEVICE INCLUDING SAME

CROSS REFERENCE TO RELATED APPLICATION

This application is a Continuation of application Ser. No. 17/976,136, filed on Oct. 28, 2022, which claims priority to Korean Patent Application No. 10-2021-0147362, filed Oct. 29, 2021, Korean Patent Application No. 10-2022-0134358, filed Oct. 18, 2022, and Korean Patent Application No. PCT/KR2022/015890, filed Oct. 18, 2022, the entire contents of which are incorporated herein for all purposes by this reference.

BACKGROUND OF THE INVENTION

1. Field of the Invention

The present disclosure relates to an electrochemical device separator having improved dry adhesion and wet adhesion.

2. Description of the Related Art

A secondary battery includes a cathode, an anode, a separator, and an electrolyte which are key components. Such a secondary battery is a high-density energy storage device that is charged and discharged by reversible conversion between chemical energy and electrical energy and has various applications such as small electronic equipment including mobile phones, laptop computers, etc. Recently, applications have rapidly expanded to hybrid electric vehicles (HEVs), plug-in electric vehicles (Plug-in EVs), electric bicycles (e-bikes), and energy storage systems (ESS) to deal with environmental issues, high oil price, high energy efficiency, and energy storage with high energy density.

In manufacturing and using secondary batteries, ensuring safety thereof is an important challenge. Particularly, separators commonly used in electrochemical devices exhibit extreme thermal shrinkage behavior in high-temperature conditions due to their material properties and process characteristics when manufactured, thereby having safety issues. To ensure the safety of secondary batteries, an organic-inorganic composite porous separator having an organic-inorganic composite porous coating layer has been proposed (refer to Korean Patent Application No. 10-2004-0070096). According to this document, the organic-inorganic composite porous coating layer is formed by applying a mixture of a binder resin and inorganic particles to a porous substrate for a battery separator. However, when forming an electrode assembly by stacking electrodes and a separator, there is a risk that the electrodes and the separator are separated due to insufficient adhesion therebetween. In this case, there is a problem that inorganic particles dislodged during the separation result in local defects in a device. To improve the adhesion, a technique of applying an acrylic binder to an organic-inorganic composite porous coating layer has been proposed. When an acrylic binder is used, dry adhesion can be improved but wet adhesion is not improved because the coating layer swells or is eluted by an electrolyte introduced into the battery cell. Therefore, it is necessary to develop a separator having a high adhesion from the time of manufacturing the separator including an organic-inorganic composite porous coating layer to the time of applying the separator to a battery cell.

SUMMARY OF THE INVENTION

An objective of the present disclosure is to provide a separator having excellent adhesion with an electrode both in a dry state and a wet state. Another objective of the present disclosure is to provide a separator in which inorganic particles are not dislodged from an organic-inorganic composite porous coating layer and which maintains high durability and insulation. Other objectives and advantages of the present disclosure will be appreciated by a description given below. It will be readily apparent that the objectives and advantages of the present disclosure can be achieved by means or methods and combinations thereof recited in the claims.

An embodiment of the present disclosure relates to a separator for an electrochemical device, the separator including a separator substrate and an organic-inorganic composite porous coating layer on at least one surface of the separator substrate. The separator substrate is a porous film including a polyolefin-containing polymer. The organic-inorganic composite porous coating layer includes polymer resin particles and inorganic particles. In the polymer resin particles, each particle includes a polyvinylidene fluoride-containing polymer (PVDF-containing polymer) and an acrylic polymer. The PVDF-containing polymer has a Hansen solubility parameter (HSP) value of 13 or less and preferably 1 or more.

Another embodiment of the present disclosure is configured such that the PVDF-containing polymer includes a homopolymer of vinylidene fluoride (for example, polyvinylidene fluoride), a copolymer of vinylidene fluoride and another polymerizable monomer (co-monomer), or a mixture of two or more of the homopolymers and copolymers. The co-monomer includes one or more substances selected from the group consisting of tetrafluoroethylene, hexafluoropropylene, trifluoroethylene, chlorofluoroethylene, 1,2 difluoroethylene, perfluoro(methylvinyl)ether, perfluoro (ethylvinyl)ether, perfluoro (propylvinyl) ether, durfluoro(1, 3 dioxole), perfluoro(2,2-dimethyl-1,3-dioxole), trichloroethylene, and vinyl fluoride.

Another embodiment of the present disclosure is configured such that the PVDF-containing polymer includes a copolymer of vinylidene fluoride and the co-monomer as a polymerization unit, in which the content of the co-monomer falls within a range of 1 wt % to 20 wt % with respect to 100 wt % of the PVDF-containing polymer.

Another embodiment of the present disclosure is configured such that the PVDF-containing polymer has a melting point (Tm) in the range of 80° C. to 200° C.

Another embodiment of the present disclosure is configured such that the acrylic polymer is a polymer having carboxylic acid esters as repeating units.

Another embodiment of the present disclosure is configured such that the acrylic polymer has a glass transition temperature (Tg) 40° C. or lower.

Another embodiment of the present disclosure is configured such that the inorganic particles have an average particle size in the range of 200 nm to 3 μm.

Another embodiment of the present disclosure is configured such that the amount of the particle-phase binder resin in the organic-inorganic composite porous coating layer falls within the range of 1 wt % to 30 wt % with respect to 100 wt % of the organic-inorganic composite porous coating layer.

The organic-inorganic composite porous coating layer of the present disclosure has a porous structure in which a mixture of inorganic particles and binder resin particles are connected and integrated into a layered structure which is porous due to the interstitial volume formed between the inorganic and the binder resin particles.

Another embodiment of the present disclosure is configured such that the inorganic particles do not undergo oxidation and/or reduction at a voltage level in a range of 0 V to 5 V (Li/Li+), which is an operating voltage range of an electrochemical device.

Another embodiment of the present disclosure relates to an electrochemical device including an anode, a cathode, and the separator, where the separator is interposed between the anode and the cathode.

Another embodiment of the present disclosure is configured such that the organic-inorganic composite porous coating layer includes an adhesive surface portion present from an outermost surface of the organic-inorganic composite porous coating layer to a depth corresponding to 10% of a thickness of the organic-inorganic composite porous coating layer, and a concentration of the polymer resin particles present in the adhesive surface portion is greater than a concentration of the inorganic particles present in the adhesive surface portion.

Another embodiment of the present disclosure relates to an electrochemical device, including an anode, a cathode, an electrolyte, and the separator, where the separator is interposed between the anode and the cathode, and where the adhesive surface portion is in direct contact with the anode, and/or with the cathode. In one embodiment, a Hansen solubility parameter (HSP) value of the electrolyte is 8 and more greater than that of the PVDF containing polymer.

Another embodiment of the present disclosure is configured such that the organic-inorganic composite porous coating layer is present on both surfaces of the separator substrate, and each of the organic-inorganic composite porous coating layers includes an adhesive surface portion present from an outermost surface of each organic-inorganic composite porous coating layer to a depth corresponding to 10% of a thickness of the organic-inorganic composite porous coating layer, and a concentration of the polymer resin particles present in each adhesive surface portion is greater than a concentration of the inorganic particles present in each adhesive surface portion.

Another embodiment of the present disclosure relates to an electrochemical device including an anode, a cathode, and the separator, where the separator is interposed between the anode and the cathode, and where one adhesive surface portion is in direct contact with the cathode, and the opposite adhesive surface portion is in contact with the anode.

The separator according to the present disclosure is configured such that a particle-phase binder resin including a mixture of an acrylic binder and a PVDF-containing binder is present in an organic-inorganic composite porous coating layer. Therefore, the separator has excellent adhesion to an electrode both in a dry state and a wet state. Therefore, the form stability and the processability of an electrode assembly can be improved in a roll-to-roll continuous process in which electrodes and the separator are stacked to form an electrode assembly. In addition, when a cell is manufactured using an electrode assembly including the separator, and the separator is impregnated with an electrolyte, a high adhesive strength between the separator and the electrodes can be maintained, and thus the interfacial resistance property of the cell does not deteriorate. In addition, since the binder resin particles maintain high dry adhesion and high wet adhesion, the inorganic particles included in the organic-inorganic composite porous coating layer are not dislodged but remain stably fixed. Therefore, the form stability of the separator can be improved. For this reason, the thermal safety and electrical insulation of the cell are improved. In addition, since the porous coating layer has a porous structure due to the inter-particle interstitial volume, the porous coating layer does not interfere with ion conduction between the electrode and the separator. Therefore, the porous coating layer exhibits a minor increase in resistance and has a good lifespan.

BRIEF DESCRIPTION OF THE DRAWINGS

The accompanying drawings illustrate preferred embodiments of the present disclosure and illustrate the principles of the present disclosure in conjunction with a detailed description given below, but the scope of the present disclosure is not limited thereto. The shape, size, scale, or ratio of the elements illustrated in the drawings and described herein may be exaggerated to emphasize the clarity of each element.

FIG. 1 is a schematic view illustrating a cross section of a separator according to one embodiment of the present disclosure;

FIGS. 2A and 2B are SEM images obtained before and after electrolyte impregnation, respectively, and the SEM images show the surface of a separator prepared according to Example 1;

FIGS. 3A and 3B are SEM images obtained before and after electrolyte impregnation, respectively, and the SEM images show the surface of a separator prepared according to Comparative Example 1; and FIGS. 4A and 4B are schematic diagrams illustrating cross-sections of a separating membrane according to embodiments of the present disclosure, in which a portion having a relatively high amount of binder resin is formed on the surface of the separating membrane. Specifically, FIG. 4A is a schematic diagram illustrating a separating membrane comprising an organic-inorganic composite porous coating layer on one surface of a separator substrate, and FIG. 4B is a schematic diagram illustrating a separating membrane comprising organic-inorganic composite porous coating layers on both surfaces of a separator substrate.

FIGS. 5A-5C are schematic diagrams illustrating electrochemical devices according to embodiments of the present disclosure. Specifically, FIG. 5A is a schematic diagram illustrating an electrochemical device which comprises a separator with organic-inorganic composite porous coating layers on both surfaces of a separator substrate, and FIG. 5B is a schematic diagram illustrating an electrochemical device which comprises a separator with an organic-inorganic composite porous coating layer on a surface of the separator substrate which is adjacent to an anode, and FIG. 5C is a schematic diagram illustrating an electrochemical device which comprises a separator with an organic-inorganic composite porous coating layer on a surface of the separator substrate which is adjacent to a cathode.

FIGS. 6A and 6B are SEM images obtained before and after electrolyte impregnation, respectively, and the SEM images show the surface of a separator prepared according to Comparative Example 2.

DESCRIPTION OF THE PREFERRED EMBODIMENTS

Prior to giving the following detailed description of the present disclosure, it should be noted that the terms and words used in the specification and the claims should not be construed as being limited to ordinary meanings or dictionary definitions but should be construed in a sense and concept consistent with the technical idea of the present disclosure, on the basis that the inventor can properly define the concept of a term to describe its invention in the best way possible. The exemplary embodiments described herein and the configurations illustrated in the drawings are presented for illustrative purposes and do not technical spirit of the present exhaustively represent the disclosure. Accordingly, it should be appreciated that there will be various equivalents and modifications that can replace the exemplary embodiments and the configurations at the time at which the present application is filed.

The present disclosure relates to a separator for an electrochemical device. According to the present disclosure, the separator includes a porous separator substrate and an organic-inorganic composite porous coating layer on at least one surface of the separator substrate. The porous coating layer contains polymer resin particles as a binder, and the particles contain an acrylic polymer and a PVDF-containing polymer.

FIGS. 1, 4A and 4B are schematic views illustrating cross sections of a separator according to embodiments of the present disclosure. With reference to FIG. 1, it can be seen that a separator substrate has one side coated with an organic-inorganic composite porous coating containing inorganic particles and binder resin. Referring to FIG. 4A, the separator 100 according to one embodiment of the present disclosure includes a separator substrate 110 and organic-inorganic composite porous coating layer 120 formed on one surface of the separator substrate 110. An outermost portion of the organic-inorganic composite porous coating layer 120 includes an adhesive surface portion 121. With reference to FIG. 4B, this is an embodiment of the present disclosure wherein an organic-inorganic composite porous coating layer 120 is formed on both sides of the separator substrate 110. Hereinafter, exemplary embodiments of the present disclosure will be described in detail with reference to the accompanying drawings.

According to one embodiment of the present disclosure, the separator substrate electrically isolates an anode and a cathode from each other. The separator provides a lithium pathway while preventing short-circuiting between the anode and the cathode.

Any substrate can be used without limitation if it does not interfere with the function of the separator of an electrochemical device. As such as a separator substrate, a porous polymer film or nonwoven fabric including one or more selected from among polyolefins, polyethyleneterephthalates, polybutyleneterephthalates, polyacetals, polyamides, polycarbonates, polyimides, polyetheretherketones, polyethersulfones, polyphenylene oxides, polyphenylenesulfides, and polyethylenaphthalenesulfides may be used as the separator substrate.

In the present disclosure, the thickness of the separator substrate may fall in the range of 3 μm to 50 μm, preferably 10 μm to 40 μm, more preferably 20 μm to 30 μm. Although the thickness of the separator substrate is not limited to the range described above, when the thickness of the separator substrate is thinner than the lower limit of the above range, the mechanical properties of the separator substrate may deteriorate such that a separator including the separator substrate may be easily damaged during the use of the battery cell. The pore size and porosity of the separator substrate are also not particularly limited. However, the pore size and porosity of the separator substrate may fall within the range of 0.01 μm to 50 μm, preferably 10 μm to 40 μm, more preferably 20 μm to 30 μm, and the range of 10 vol % to 95 volt, preferably 25 vol % to 75 vol %, more preferably 40 vol % to 50 vol % respectively.

The organic-inorganic composite porous coating layer may include a mixture of a plurality of inorganic particles and a binder. Since the separator substrate is covered by a coating layer including inorganic particles, the thermal resistance and mechanical properties of the separator can be improved. According to one preferred embodiment of the present disclosure as shown in FIG. 4B, each of the principal surfaces of the separator substrate is provided with the organic-inorganic composite porous coating layer. Since each of the principal surfaces of the separator is provided with the organic-inorganic composite porous coating layer, wet and dry adhesion can be improved between the anode and the separator and between the cathode and the separator.

According to an embodiment of the present disclosure, in the organic-inorganic composite porous coating layer, the amount of the polymer resin particles relative to 100 wt % of the porous coating layer may fall within the range of 1 wt % to 30 wt %. By adjusting the amount of the polymer resin within the above range, reducing the heat resistance of the coating film and lowering the adhesive strength of the porous coating layer may be prevented. The organic-inorganic composite porous coating layer has a porous structure due to an interstitial volume between inorganic particles and binder including polymer resin particles. In addition, the interstitial volume also serves as a spacer to enable the physical shape of the coating layer to be maintained. The interstitial volume refers to a space in which the inorganic particles and the binder resin polymer particles are substantially confined while being in surface contact with each other. In addition, since the inorganic particles generally are not likely to change in physical properties even at temperatures above 200° C., the separator has good thermal resistance due to the presence of the organic-inorganic composite porous coating layer. In the present disclosure, the organic-inorganic composite porous coating layer on an either-side surface of the separator may have a thickness in the range of 1 μm to 50 μm, preferably the range of 2 μm to 30 μm, or more preferably the range of 2 μm to 20 μm.

In the present disclosure, the binder includes polymer resin particles. In one embodiment of the present disclosure, of 100 wt % of the binder, the polymer resin particles are present in a percentage in the range of 90 wt % to 99 wt %, more preferably 92 wt % to 96 wt %. The polymer resin particles may also be referred to as polymer particles or binder particles. The binder particles interconnect and coalesce the inorganic particles to form a porous coating layer having a layered structure. Referring to FIG. 1, it is shown that the organic-inorganic composite porous coating layer is on a surface of the separator substrate, and the coating layer includes the inorganic particles and binder particles.

According to one specific embodiment of the present disclosure, each binder particle may include a PVDF-containing polymer and an acrylic polymer. That is, the binder particle may be a blend, or mixture, of the PVDF-containing polymer and the acrylic polymer. In one specific embodiment of the present disclosure, the PVDF-containing polymer is present in the binder particle in an amount the range of 50 wt % to 80 wt % relative to 100 wt % of the blend, preferably 60 wt % to 75 wt % relative to 100 wt % of the blend, more preferably 65 wt % to 70 wt % relative to 100 wt % of the blend.

In addition, the acrylic polymer is present in an amount in the range of 20 wt % to 50 wt % relative to 100 wt % of the blend, preferably 30 wt % to 45 wt % relative to 100 wt % of the blend, more preferably 35 wt % to 40 wt % relative to 100 wt % of the blend.

When the PVDF-containing polymer and the acrylic polymer satisfy the amount ranges described above, both the dry adhesion and the wet adhesion of the separator can be improved.

In the present disclosure, the particle size range of the binder particles may be the same as the particle size range of the inorganic particles.

In one specific embodiment of the present disclosure, the PVDF-containing polymer may have a melting point in the range of 80° C. to 200° C., preferably 100° C. to 150° C., and exhibit high oxidation resistance in the electrolyte.

In one embodiment of the present disclosure, the PVDF-containing polymer preferably has a Hansen Solubility parameter (HSP) value at 25° C. of 13 or less. Specifically, the PVDF-containing based polymer preferably has a Hansen Solubility parameter (HSP) value at 25° C. of 13 or less. Preferably, the PVDF-containing based polymer has a Hansen Solubility parameter (HSP) value at 25° C. of 1 or more and 13 or less, 2 or more and 12 or less, 3 or more and 11 or less, 4 or more and 10 or less, 5 or more and 9 or less, and 6 or more and 8 or less.

Since the acrylic binder used in general has high reactivity with the electrolyte and swells in the electrolyte even though it has a cross-linked structure, it is difficult to achieve good wet adhesion because the binder sinks under the inorganic material after the separator is impregnated with the electrolyte as shown in FIG. 3B when the acrylic binder is used alone. PVDF-containing polymers having an HSP value of 13 or less and 1 or more are advantageous in maintaining the particle phase even in the electrolyte because such polymers have a significant difference in HSP value. Therefore, in the case where a PVDF-containing polymer having an HSP value of 13 or less and 1 or more and an acrylic polymer are included in one particle, wet adhesion is improved because the PVDF-containing polymer prevents the acrylic binder from sinking below the inorganic particles in the electrolyte.

In this aspect, the organic-inorganic composite porous coating layer according to the present disclosure is configured such that the amount of the binder resin is 50 wt % or higher relative to 100 wt % of the organic-inorganic composition porous coating layer, in a surface portion ranging from the outermost surface of the coating layer to a depth corresponding to 10% or less, or 9% or less, or 8% or less, or 7% or less, or 6% or less, or 5% or less of the thickness of the coating layer. Alternatively, the amount of the binder resin in the surface region portion is 55 wt % or higher, 60 wt % or higher, 65 wt % or higher, 70 wt % or higher, 75 wt % or higher, 80 wt % or higher, 85 wt % or higher, 90 wt % or higher, or 95 wt % or higher relative to 100 wt % of the organic-inorganic composition porous coating layer. For convenience of description, the above-described surface portion will be referred to as an adhesive surface portion of the organic-inorganic composite porous coating layer. FIG. 4 is a schematic view illustrating a cross section of the separator 100 with the adhesive surface portion 121. The adhesive surface portion is a portion of the porous coating layer 120 and is inseparably combined with the porous coating layer. That is, the adhesive surface portion, even if shown for purposes of illustration, is not physically distinct from the porous coating layer. Stated differently the adhesive surface portion is not a separate layer, but rather a contiguous portion of the porous coating layer. The adhesive surface portion is used to clearly show a constructive feature in which the binder does not sink and is present in a high amount to be blended with the inorganic particles. The term "outermost surface" refers to a surface that comes into contact with an electrode when the separator is assembled with electrodes, and the term "downward" refers to a direction toward the separator substrate. In FIG. 4, reference numeral 110 denotes the separator substrate.

The Hansen solubility parameter (HSP) was developed by Dr. Charles M. Hansen, and there are three parameters depending on the degree of binding in a substance:

(1) Solubility parameter $\delta D$ attributable to non-polar dispersion forces;

(2) Solubility parameter $\delta P$ attributable to dipolar inter-molecular force; and (3) Solubility parameter $\delta H$ attributable to hydrogen bonds.

As such, with the HSP, it is possible to accurately and systematically assess the solubility or mixability of a substance by the following expressions:

$$HSP = (\delta D, \delta P, \delta H), (J/cm^2)^{\frac{1}{2}} \tag{1}$$

$$\delta Tot = (\delta D^2 + \delta P^2 + \delta H^2)^{\frac{1}{2}}, (J/cm^2)^{\frac{1}{2}} \tag{2}$$

HSP is a vector having magnitude and direction in a space defined by three parameters, and $\delta Tot$ represents the magnitude of the HSP vector. The basic unit representing HSP is $(J/cm^3)\frac{1}{2}$. These HSP values can be calculated using a program called Hansen Solubility Parameters in Practice (HSPiP) developed by the Dr. Hansen and his group, which proposed the HSP. Specifically, the HSP value may refer to a value at 25° C. that is calculated for a desired material selected in the HSPiP program (5.0.04 version) after determining the structural formula of the material to be measured. The structural formula of the above polymer may be derived by assuming that the content of the repeating unit A and the content of the repeating unit B are regularly repeated.

In one embodiment of the present disclosure, the PVDF-containing polymer is a polymer including vinylidene fluoride as the polymerization units. The PVDF-containing polymer may include a homopolymer of vinylidene fluoride (i.e., polyvinylidene fluoride), a copolymer of vinylidene fluoride and a polymerizable monomer (co-monomer), or a mixture thereof.

Preferably, the PVDF containing polymer includes, as a polymerization unit, a copolymer of vinylidene fluoride and a co-monomer. Preferably, the co-monomer is contained in an amount in the range of 1 wt % to 20 wt % with respect to 100 wt % of the PVDF-containing polymer. The amount of the co-monomer may be a substitution degree of the PVDF containing polymer.

In the present disclosure, the amount of the co-monomer in the PVDF-containing polymer can be measured by $^1$H-NMR using a Varian 500 MHz instrument. For the details of the measurement method, Journal of Materials Chemistry, 2012, 22, 341 or AMT-3412-Ok may be referred. For the identification of the NMR spectra, appropriate equipment, such as Bruker Avance III HD 700 Mhz NMR or Varian 500 MHz NMR, may be used.

The co-monomer may be one or more selected from the group consisting of tetrafluoroethylene, hexafluoropropylene, trifluoroethylene, chlorofluoroethylene, 1,2 difluoroethylene, perfluoro (methylvinyl) ether, perfluoro (ethylvinyl) ether, perfluoro (propylvinyl) ether, durfluoro (1,3 dioxole), perfluoro (2,2-dimethyl-1,3-dioxole), trichloroethylene, and vinylfluoride. Non-limiting examples of the PVDF-based polymer include polyvinylidene fluoride, polyvinylidene fluoride-co-hexafluoropropylene, polyvinylidene fluoride-co-trichloroethylene, polyvinylidene fluoride-co-tetrafluoroethylene, polyvinylidene fluoride-co-trifluoroethylene, and polyvinylidene fluoride-co-trifluoroethylene. Any one substance selected from the example may be used alone. Alternatively, a mixture of two or more substances selected from the examples may be used. The PVDF-containing polymer may preferably include PVDF-HFP, where the amount of the co-monomer HFP may be a substitution degree of the The PVDF-containing PVDF-containing polymer. polymer may preferably include PVDF-HFP, where the substitution degree of HFP ranges from 1 wt % to 20 wt %, preferably, 5 wt % to 15 wt %.

The PVDF-containing polymer exhibits good adhesion in a dry state and has excellent oxidation resistance, thereby contributing to the adhesion of inorganic particles or maintaining the adhesion between the separator and the electrodes.

The acrylic polymer has a glass transition temperature of 40° C. or lower. The acrylic polymer is a polymer in which a carboxylic acid ester is a repeating unit. Preferably, the acrylic polymer is a (meta)acrylic acid ester. Specific examples of such a (meth)acrylic acid ester include (meth) acrylic acid methyl, (meth)acrylic acid ethyl, (meth)acrylic acid n-propyl, (meth)acrylic acid i-propyl, (meth)acrylic acid n-butyl, (meth)acrylic acid i-butyl, (meth)acrylic acid n-amyl, (meth)acrylic acid i-amyl, (meth)acrylic acid hexyl, (meth)acrylic acid cyclohexyl, (meth)acrylic acid 2-ethyl-hexyl, (meth)acrylic acid n-octyl, (meth)acrylic acid nonyl, (meth) acrylic acid decyl, (meth)acrylic acid hydroxymethyl, (meth) acrylic acid hydroxyethyl, (meth)acrylic acid ethylene glycol, di(meth)acrylic acid ethylene glycol, di(meth)acrylic acid propylene glycol, tri(meth)acrylic acid trimethylolpropane, tetra(meth)acrylic acid pentaerythritol, hexa (meth)acrylic acid dipentaerythritol, (meth)allyl acrylate, and di(meth)ethylene acrylate. One or more compounds selected from the examples of the (meth)acrylic acid ester may be used. Of these, one or more compounds selected from (meth)acrylic acid methyl, (meth)acrylic acid ethyl, and (meth)acrylic acid2-ethylhexyl are preferably used. More specifically, (meth) acrylic acid methyl is preferably used.

In addition, the acrylic polymer may have constituent units derived from copolymerizable unsaturated monomers as well as repeating units derived from unsaturated carboxylic acid esters.

The acrylic polymer has good flexibility and adhesion. However, since the acrylic polymer is not resistant to oxidation, when the acrylic polymer is used alone, the acrylic polymer oxidizes and degrades by repeated charging and discharging operations. Therefore, it is difficult to obtain good charging and discharging characteristics.

According to the present disclosure, since the polymer particles including the PVDF-containing polymer and the acrylic polymer are used as a binder, and it is possible to secure both dry adhesion and wet adhesion when a separator and electrodes are combined.

In one embodiment of the present disclosure, the separator may have a dry adhesion with an electrode of 10 gf/25 mm or more and a wet adhesion with an electrode of 10 gf/20 mm or more. The electrode may be a cathode, an anode, or both. The electrodes are not particularly limited when they can be used as an anode or a cathode for a lithium ion secondary battery. The adhesion may be measured using UTM equipment. Specifically, the dry adhesion refers to an adhesive strength when the electrode and the separator are pressed against each other at 60° C. at a pressure of 6.5 MPa for one second and then separated from each other at an angle of 180° at a rate of 300 mm/min. In addition, the wet adhesion refers to an adhesive strength measured when the electrodes and the separator are stacked and packaged into a pouch, an electrolyte is introduced into the pouch, and the stack of the electrodes and the separator is pressed at 70° C. at a pressure of 5 kgf for 5 minutes, and then the electrodes and the separator are separated at an angle of 90° at a rate of 300 mm/min.

The inorganic particles are not particularly limited if they are electrochemically stable. That is, the inorganic particles are not particularly limited if they are not oxidized and/or reduced in the operating voltage range (for example, 0 V to 5 V based on Li/Li+) of the electrochemical device. In particular, when inorganic particles having the ability to transfer ions are used, the ionic conductivity of the electrochemical device can be increased, resulting in improvement in performance. In addition, when inorganic particles having a high dielectric constant are used as the inorganic particles, the ionic conductivity of the electrolyte may be improved because the inorganic particles contribute to an increase in the degree of dissociation of an electrolyte salt, such as a lithium salt, in a liquid electrolyte.

For the above reasons, the inorganic particles may include inorganic particles having a high dielectric constant of 5 or more or 10 or more, inorganic particles having the ability to transfer lithium ions, or a mixture thereof. Non-limiting examples of the inorganic particles having a dielectric constant of 5 or more include $BaTiO_3$, $Pb(Zr, Ti)O_3$ (PZT), $Pb_{1-x}La_xZr_{1-y}Ti_yO_3$ (PLZT, where $0<x<1$ and $0<y<1$), $Pb(Mg_{1/3}Nb_{2/3})O_3$—$PbTiO_3$ (PMN-PT), Hafnia ($HfO_2$), $SrTiO_3$, $SnO_2$, $CeO_2$, MgO, NiO, Cao, ZnO, $ZrO_2$, $Y_2O_3$, $Al_2O_3$, SiC, $TiO_2$, and the like. Any one of these materials may be used alone, or two or more materials of these materials may be used in combination. In addition, the synergistic effect can be obtained when the high-dielectric inorganic particles and the inorganic particles having the ability to transfer lithium ions are used in combination.

Non-limiting examples of the inorganic particles having the ability to transfer lithium ions include: (LiAlTiP) $_xO_y$-containing glass ($x<4$, $0<y<13$) such as lithium phosphate ($Li_3PO_4$), lithium titanium phosphate ($Li_xTi_y(PO_4)_3$, $0<x<y<3$), lithium aluminum titanium phosphate ($Li_xAl_yTi_z$ $(PO_4)_3$, $0<x<2$, $0<y<z<3$), and $14Li_2O$-$9Al_2O_3$-$38TiO_2$-$39P_2O_5$, etc.; lithium germanium thiophosphate ($Li_xGe_y$-$P_zS_w$, $0<x<4$, $0<y<1$, $0<z<1$, $0<w<5$) such as $Li_{3.25}Ge_{0.25}P_{0.75}S_4$, etc.; lithium nitride ($Li_xN_y$, $0<x<y<2$) such as $Li_3N$, etc.; $SiS_2$-containing glass ($Li_xSi_yS_z$, $0<x<3$, $0<2$, $0<z<4$) such as $Li_3PO_4$—$Li_2S$—$SiS_2$, etc.; $P_2S_5$ containing glass ($Li_xP_yS_z$, $0<x<3$, $0<y<3$, $0<z<7$) such as $LiI$-$Li_2S$—$P_2S_5$, etc.; and mixtures thereof.

In the organic-inorganic composite porous coating layer, the amount of the inorganic particles is determined depending on the thickness, pore size, and porosity of the formed organic-inorganic composite porous coating layer. In the organic-inorganic composite porous coating layer, the amount of the inorganic particles relative to 100 wt % of the porous coating layer may fall within the range of 70 wt % to 99 wt %. When the content of the inorganic particles is lower than 70 wt %, the heat resistance of the coating film may be reduced. When the amount of the inorganic particles is excessively high, the adhesive strength of the porous coating layer may be weak because the amount of the binder is insufficient.

According to one specific embodiment of the present disclosure, the size of the inorganic particles in the organic-inorganic composite porous coating layer is not particularly limited. However, the size of the inorganic particles in the organic-inorganic composite porous coating layer may be in the range of 0.001 µm to 10 µm, preferably 0.1 µm to 10 µm, more preferably from 1 µm to 10 µm, for the formation of a coating layer with uniform thickness and appropriate porosity. For example, the size may be in the range of 200 nm to 3 µm, the range of 200 nm to 2 µm, or the range of 200 nm to 1 µm. When the size of the inorganic particles satisfies the mentioned range, it is easy to adjust the physical properties of the separator because the dispersion is maintained. In addition, it is possible to prevent the thickness of the organic-inorganic composite porous coating layer from increasing, the mechanical properties of the coating layer may be improved. In addition, there is a low probability that an internal short-circuit occurs due to an excessively large pore size when the battery is charged or discharged.

The pore size and porosity of the organic-inorganic composite porous coating layer depend primarily on the size of the inorganic particles. For example, when the inorganic particles having a particle size of 1 µm or less are used, the pores formed have a size of 1 µm or less. The pores are filled with an electrolyte that is subsequently introduced, and the electrolyte in the pores function as an ion pathway. Therefore, the pore size and porosity are principal factors determining the ionic conductivity of the organic-inorganic composite porous coating layer. Preferably, the porosity and pore size of the organic-inorganic composite porous coating layer according to the present disclosure are preferably in the range of 0.001 µm to 10 µm, preferably 0.1 µm to 10 µm, more preferably from 1 µm to 10 µm, and the range of 5 vol % to 95 vol %, preferably 10 vol % to 80 vol %, more preferably 20 vol % to 70 vol %, respectively.

According to one embodiment of the present disclosure, a separator including the organic-inorganic composite porous coating layer may be manufactured by mixing binder particles and inorganic particles with a water-based solvent to prepare a coating slurry and applying the coating slurry on at least one surface of a separator substrate.

As a coating method, dip coating, die coating, roll coating, comma coating, or a combination thereof may be used.

In one embodiment of the present disclosure, the water-based solvent may include one or more selected from water and $C_1$-$C_5$ alcohols. For example, the water-based solvent may include a mixture of water and isopropyl alcohol. Since the water-based solvent is used, the binder particles do not dissolve but remain as particles in the water-based solvent. That is, the binder particles are dispersed in the water-based solvent. For this reason, the binder particles can be maintained as the particle phase in the prepared organic-inorganic composite porous coating layer. Thus, it is prevented that binder particles enter the pores of the separator substrate or sink to the bottom of the porous coating layer.

In one embodiment of the present disclosure, it is preferable that the coating slurry has a solid content (not including the solvent) of 20 wt % to 50 wt %. As described above, the porous coating layer of the separator according to the present disclosure is characterized in that the binder does not sink to the bottom but is present at a high content in a superficial region of the coating layer. This may be attributable to the inclusion of a PVDF-containing polymer having an HSP value of 13 or less and 1 or more in the binder particles as described above. This effect may be further enhanced when the concentration of solids in the slurry is controlled to be within the range described above.

The separator may be applied to an electrochemical device. The electrochemical device may include a cathode and an anode, and the separator may be provided between the cathode and the anode. Examples of the electrochemical device include all devices that perform electrochemical reactions. Specifically, for example, all kinds of primary cells, secondary cells, fuel cells, solar cells, and capacitors fall within the category of the electrochemical device. Preferably, the electrochemical devices may be lithium ion secondary batteries including lithium metal secondary cells, lithium ion secondary cells, lithium polymer secondary cells, and lithium ion polymer secondary cells among secondary cells.

FIG. 5A is a schematic diagram showing an electrochemical device including a separator 100 in which an organic/inorganic composite porous coating layer 120 is disposed on both sides of a separator substrate 110. When using a separator in which an organic/inorganic composite porous coating layer 120 is disposed on both sides of the separator substrate 110 as shown in FIG. 5A, the organic/inorganic composite porous coating layer 120 may be provided on each of the anode 200 and the cathode 300.

FIG. 5B is a schematic diagram showing an electrochemical device including a separator 100 in which an organic/inorganic composite porous coating layer 120 is disposed on one surface of the separator substrate 110 adjacent to the anode 200. As shown in FIG. 5B, a separator in which an organic/inorganic composite porous coating layer 120 is disposed on one surface of the separator substrate 110 may be used, and the coating layer 120 may be disposed on the anode 200.

FIG. 5C schematically shows an electrochemical device including a separator 100 in which an organic/inorganic composite porous coating layer 120 is disposed on one surface of the separator substrate 110 adjacent to the cathode 300. As shown in FIG. 5C, the separator 100 in which the organic/inorganic composite porous coating layer 120 is disposed on one surface of the separator substrate 110 is used, and the organic/inorganic composite porous coating layer 120 may be disposed on the cathode 300.

In a specific embodiment according to the present invention, in the electrochemical device, the electrochemical device includes an anode and a cathode, and an electrolyte solution may be included between the anode and the cathode, and the Hansen solubility factor of the electrolyte may be greater than by 8 or more than the Hansen solubility factor of the PVDF-based polymer. Specifically, the Hansen solubility factor of the electrolyte solution can be greater than by 8 or more and 21 or less, by 9 or more and 20 or less, by 10 or more and 19 or less, by 11 or more and 18 or less, by 12 or more and 17 or less, by 13 or more and 16 or less, or by 14 or more and 15 or less, than the Hansen solubility factor of the PVDF-based polymer. In the present specification, the Hansen solubility factor of the electrolyte may mean a Hansen solubility factor of an organic solvent included in the electrolyte. By controlling the difference between the Hansen solubility factor of the electrolyte and the Hansen solubility factor of the PVDF-based polymer in the above range, the PVdF-based polymer is placed in one particle with the acrylic binder so that the acrylic binder does not sink under the inorganic material even under the electrolyte and thereby wet adhesion can be realized.

In a specific embodiment according to the present invention, the Hansen solubility factor of the electrolyte contained in the electrochemical device may be 14 or more and 35 or less. Specifically, the Hansen solubility factor of the electrolyte contained in the electrochemical device is 15 or more and 34 or less, 16 or more and 33 or less, 17 or more and 32 or less, 18 or more and 31 or less, 19 or more and 30 or less, 20 or more and 29 or less, 21 or more and 28 or less, or 21 or more and 27 or less. More specifically, the Hansen solubility factor of the electrolyte included in the electrochemical device may be 21 or more and 22 or less. By adjusting the Hansen solubility factor of the electrolyte in the above range, the acrylic binder contained in one particulate binder resin has a high affinity to the electrolyte and swells under the electrolyte even though it is crosslinked. After the electrolyte impregnation, the binder migrates to the bottom of the inorganic material, thereby preventing the deterioration of wet adhesion. In one specific embodiment of the present disclosure, the electrochemical devices may be manufactured according to conventional methods known in the art. According to one embodiment of the present disclosure, there is provided a method of forming the separator described above to be disposed between the anode and the cathode. In addition, an electrode assembly in which the anode, the separator, and the cathode are stacked is introduced into a battery case, and then an electrolyte liquid is charged into the battery case to produce the electrochemical device.

According to one embodiment of the present disclosure, the electrode is not particularly limited, and the electrode can be manufactured in the form in which an electrode active material is bonded to a current collector by a known method in the art. Non-limiting examples of the cathodic active material of the electrode active materials are conventional cathodic active materials that can be used in cathodes of conventional electrochemical devices. Particularly, lithium intercalation materials such as lithium manganese oxide, lithium cobalt oxide, lithium nickel oxide, lithium iron oxide, and combinations thereof may be used. Non-limiting examples of the anodic active material are conventional anodic active materials that can be used in anodes of conventional electrochemical devices. Particularly, lithium intercalation materials such as lithium metal, lithium alloy, carbon, petroleum coke, activated carbon, graphite, and other carbides are preferably used. Non-limiting examples of the cathodic current collector include foils made of aluminum, nickel, or a combination thereof. Non-limiting examples of the anodic current collector include foils made of copper, gold, nickel, or a combination thereof.

The electrolyte liquid that can be used in the present disclosure is a liquid in which a salt with a structure of $A^+B^-$ is dissolved or dissociated in an organic solvent, in which: $A^+$ includes alkali metal cations such as $Li^+$, $Na^+$, $K^+$ or a combination thereof; $B^-$ includes anions such as $PF_6^-$, $BF_4^-$, $Cl^-$, $Br^-$, $I^-$, $ClO_4^-$, $ASF_6^-$, $CH_3CO_2$, $CF_3SO_3^-$, $NCF_3(SO_2)_2^-$, $CCF_2(SO_2)_3^-$ or a combination thereof; and the organic solvent includes propylene carbonate (PC), ethylene carbonate (EC), diethylcarbonate (DEC), dimethylcarbonate (DMC), dipropylcarbonate (DPC), dimethylsulfoxide, acetonitrile, dimethoxyethane, diethoxyethane, tetrahydrofuran, N-methyl-2-pyrrolidone (NMP), ethylmethylcarbonate (EMC), γ-butyrolactone, or a mixture thereof. However, the salt and the organic solvent are not limited thereto. Specifically, the organic solvent may be a mixture of ethylene carbonate (EC) and dimethylcarbonate (DMC) with a weight ratio of 1:9 to 9:1, preferably 3:7 to 7:3.

The electrolyte injection may be performed at an appropriate stage during the cell manufacturing process, depending on the manufacturing method and the required physical properties of the final product. That is, the electrolyte injection may be performed before cell assembling or at the final stage of cell assembling. In the present disclosure, the cell assembling using an electrode assembly involves winding, lamination or stack of a separator and electrodes, and folding.

Hereinafter, examples will be given to describe the present disclosure in detail. The examples according to the present disclosure described below may be modified into various forms, so that the scope of the present disclosure should not be construed as being limited to the examples described in detail below. The examples are provided to aid those skilled in the art to more easily understand the present disclosure.

EXAMPLES

Example 1

A dispersion (having a solid content of 30%) for forming a porous coating layer was prepared by dispersing polymer resin particles as a binder having a particle size of 500 nm and inorganic particles ($Al_2O_3$) having a particle size of 500 nm into water. The content ratio (on a weight basis) of the binder particles and the inorganic particles was 10:90. Next, a separator substrate which is made of polyethylene and that has a porosity of 40% and a thickness of 9 μm was prepared. The dispersion was applied to a surface of the separator substrate through a bar-coating method using a doctor blade. The applied dispersion was dried with a heat gun at a temperature of 50° C. The binder particles are blended particles in which a PVDF-containing polymer and an acrylic polymer are mixed in a weight ratio of 70:30. The PVDF-containing polymer was PVDF-HFP and had a HFP substitution degree (i.e., the amount of HFP including in the PVDF containing polymer) of 5 wt % and an HSP value of 12. The acrylic polymer was styrene-butyl acrylate.

Example 2

A separator was manufactured in the same manner as in Example 1, except that the PVDF-containing polymer used for the particle-phase binder in Example 1 was changed to a PVDF-containing polymer having an HFP substitution degree of 15 wt % and a HSP value of 13.

Example 3

A separator was manufactured in the same manner as in Example 1, except that the particle-phase binder particles are blended particles in which a PVDF containing polymer and an acrylic polymer are mixed in a weight ratio of 50:50.

Comparative Example 1

A dispersion (having a solid content of 30%) for forming a porous coating layer was prepared by dispersing a particle-phase binder (styrene-butylacrylate) having a particle size of 500 nm and inorganic particles ($Al_2O_3$) having a particle size of 500 nm into water. The amount ratio (on a weight basis) of the binder and the inorganic particles was 15:85. Next, a separator substrate which is made of polyethylene and that has a porosity of 40% and a thickness of 9 um was prepared. The dispersion was applied to a surface of the separator substrate through a bar-coating method using a doctor blade. The applied dispersion was dried with a heat gun at a temperature of 50° C. The HSP of the particle-phase binder was 17.

Comparative Example 2

A separator was manufactured in the same manner as in Example 1, except that the PVDF-containing polymer used for the particle-phase binder in Example 1 was changed to a PVDF-containing polymer having a HFP substitution degree of 22 wt % and a HSP value of 14.

Comparative Example 3

A separator was manufactured in the same manner as in Comparative Example 1, except that the particle-phase binder particles are blended particles in which a PVDF containing polymer and an acrylic polymer are mixed in a weight ratio of 30:70.

Comparative Example 4

A separator was manufactured in the same manner as in Comparative Example 1, except that the particle-phase binder particles are blended particles in which a PVDF containing polymer and an acrylic polymer are mixed in a weight ratio of 85:15.

Comparative Example 5

A dispersion (having a solid content of 30 wt %) for forming a porous coating layer was prepared by dispersing polymer resin particles as a binder having a particle size of (ethylene carbonate: ethylmethylcarbonate=7:3 (on a volume basis), $LiPF_6$ 1M). The resulting structure was left at room temperature for 24 hours. Lamination was performed with a hot press to prepare specimens. In this case, the pressing was carried out at 70° C. and 5 kgf for 5 minutes. The specimens had a size of 2 cm×6 cm.

The cathode was prepared according to a method described below. $LiNi_{0.8}CO_{0.1}Mn_{0.1}O_2$, PVDF, and carbon black were mixed at a weight ratio of 97.0:1.5:1.5 and dispersed in 2-methyl-2-pyrrolidone to prepare a cathode slurry, and the cathode slurry was applied onto an aluminum current collector, dried, and rolled to produce the cathode.

Preparation of Specimen with Dry Adhesion

Each of the separators prepared in the examples and comparative examples and an anode were stacked, and the stack was laminated with a hot press to produce specimens. In this case, the pressing was carried out at 60° C. and 6.5 MPa for 1 minute. The specimens had a size of 2.5 cm×6 cm.

The anode was prepared according to a method described below. Graphite, SBR, and CMC were mixed at a weight ratio of 89.2:10:0.8 and dispersed in distilled water to prepare an anode slurry. The anode slurry was applied onto a copper current collector, dried, and rolled to prepare the anode.

Measurement of Adhesion with Electrode

The wet adhesion and dry adhesion of the separators prepared as above were evaluated using each of the specimens prepared above, and the results are summarized in Table 1. The specimens were left at room temperature for 1 hour after the preparation, and the adhesion was measured. The dry adhesion and wet adhesion were measured using a tensile tester (UTM equipment) while peeling the separator at an angle of 180° and an angle of 90°, respectively.

TABLE 1

|  | Example 1 | Example 2 | Example 3 |
|---|---|---|---|
| Wet adhesion (gf/20 mm) | 20 | 25 | 12 |
| Dry adhesion (gf/25 mm) | 40 | 45 | 30 |

|  | Comparative Example 1 | Comparative Example 2 | Comparative Example 3 | Comparative Example 4 | Comparative Example 5 |
|---|---|---|---|---|---|
| Wet adhesion (gf/20 mm) | 0 | 2 | 2 | 8 | 0 |
| Dry adhesion (gf/25 mm) | 60 | 50 | 40 | 10 | 0 |

500 nm and inorganic particles ($Al_2O_3$) having a particle size of 500 nm into water. The amount ratio (on a weight basis) of the binder particles and the inorganic particles was 10:90. Next, a separator substrate which is made of polyethylene and that has a porosity of 40% and a thickness of 9 μm was prepared. The dispersion was applied to a surface of the separator substrate through a bar-coating method using a doctor blade. The applied dispersion was dried with a heat gun at a temperature of 50° C. The binder particles were a PVDF containing polymer in which was PVDF-HFP and had a HFP substitution degree (the amount of HFP included in the PVDF containing polymer) of 5 wt % and an HSP value of 12.

Preparation of Specimen with Wet Adhesion

Each of the separator prepared in the examples and comparative examples and a cathode were stacked, and the separator was impregnated with 1.0 g of the electrolyte Referring to Table 1, the separators according to the present disclosure have high wet and dry adhesion to the electrodes compared to the separators of the Comparative Examples. The separators of the Comparative Examples 1 to 3 exhibit high dry adhesion and low wet adhesion. Furthermore, the separators of the Comparative Examples 4 and 5 exhibit low dry adhesion and low wet adhesion. Therefore, when these separators are applied to batteries, the performance of the batteries may be deteriorated. However, since the separators according to the examples exhibit good dry adhesion and good wet adhesion, an excellent electrochemical effect can be achieved when manufacturing electrode assemblies and during the operation of batteries.

Confirmation of Shape Maintenance of Particulate binder by electrolyte

The separators obtained in Example 1 and Comparative Examples 1 and 2 were cut into 2 cm×6 cm pieces to prepare a specimen, and the specimen was prepared with an electrolyte solution of 1.0 g (ethylene carbonate: ethyl methyl carbonate=7:3, volume ratio, HSP=21.6, LiPF6 1M) and left at room temperature for 24 hours, and thereafter the coating layer, which is the surface of the specimen, was photographed by SEM to check whether the particle shape was maintained. FIGS. 2A and 2B are SEM images obtained before and after electrolyte impregnation, respectively, the SEM images showing the surface of a separator prepared according to Example 1. FIGS. 3A and 3B are SEM images obtained before and after electrolyte impregnation, respectively, the SEM images showing the surface of a separator prepared according to Comparative Example 1. FIGS. 6A and 6B are SEM images obtained before and after electrolyte impregnation, respectively, and the SEM images show the surface of a separator prepared according to Comparative Example 2. Referring to FIGS. 2A and 2B, FIGS. 3A and 3B, and FIGS. 6A and 6B, on the surface of each of the separators (i.e., surface of each of the organic-inorganic composite porous coating layers) respectively prepared according to Example 1 and Comparative Examples 1 and 2, the inorganic particles and the binder maintain a particle phase, and the inter-particle interstitial volume is formed. However, in the case of Example 1, after the separator was impregnated with the electrolyte, it was found that the binder remained as the particle phase while maintaining the interstitial volume, similarly to the state in which the separator was not yet impregnated with the electrolyte. In the case of Comparative Examples 1 and 2, the particle phase of the binder collapsed. That is, it was difficult to identify the particles. In addition, in the case of the comparative examples, since the binder sank to the bottom of the porous coating layer, the amount of the binder on the surface of the separator was small, resulting in a problem of deterioration in wet adhesion.

What is claimed is:

1. A separator for an electrochemical device, comprising:
a separator substrate; and
an organic-inorganic composite porous coating layer on at least one surface of the separator substrate,
wherein the separator substrate is a porous film comprising a polyolefin-containing polymer,
wherein the organic-inorganic composite porous coating layer comprises polymer resin particles and inorganic particles, and
wherein each particle of the polymer resin particles is a blend comprising a polyvinylidene fluoride (PVDF)-containing polymer and an acrylic polymer,
wherein the PVDF-containing polymer comprises a copolymer of vinylidene fluoride and a co-monomer as a polymerization unit, wherein the co-monomer is present in an amount ranging from 1 wt % to 20 wt % with respect to 100 wt % of the PVDF-containing polymer, and
wherein the PVDF-containing polymer is present in the polymer resin particle in an amount the range of 50 wt % to 80 wt % relative to 100 wt % of the blend,
a wet adhesion with the electrode of 10 gf/20 mm or more.

2. The separator of claim 1, wherein the co-monomer is at least one selected from the group consisting of tetrafluoroethylene, hexafluoropropylene, trifluoroethylene, chlorofluoroethylene, 1,2 difluoroethylene, perfluoro(methylvinyl) ether, perfluoro(ethylvinyl)ether, perfluoro(propylvinyl) ether, durfluoro(1,3 dioxole), perfluoro (2,2-dimethyl-1,3-dioxole), trichloroethylene, and vinylfluoride.

3. The separator of claim 1, wherein the co-monomer is present in an amount ranging from 5 wt % to 15 wt % with respect to 100 wt % of the PVDF-containing polymer.

4. The separator of claim 1, wherein the co-monomer is present in an amount ranging from 12 wt % to 20 wt % with respect to 100 wt % of the PVDF-containing polymer.

5. The separator of claim 1, wherein the co-monomer is present in an amount ranging from 15 wt % to 20 wt % with respect to 100 wt % of the PVDF-containing polymer.

6. The separator of claim 1, wherein the acrylic polymer is present in the polymer resin particle in an amount the range of 20 wt % to 50 wt % relative to 100 wt % of the blend.

7. The separator of claim 1, wherein the PVDF-containing polymer is present in the polymer resin particle in an amount the range of 50 wt % to 70 wt % relative to 100 wt % of the blend, and
wherein the acrylic polymer is present in the polymer resin particle in an amount the range of 30 wt % to 50 wt % relative to 100 wt % of the blend.

8. An electrochemical device, comprising:
an anode,
a cathode,
an electrolyte, and
the separator of claim 1,
wherein the separator is interposed between the anode and the cathode, and
wherein a Hansen solubility parameter (HSP) value of the electrolyte is 14 or more and 35 or less.

9. The separator of claim 1, wherein the separator has a dry adhesion with an electrode of 10 gf/25 mm or more.

10. The separator of claim 1, wherein the acrylic polymer comprises styrene-butyl acrylate.

11. The separator of claim 1, wherein the separator has a dry adhesion with an electrode in a range of 30 gf/25 mm to 45 gf/25 mm and a wet adhesion with the electrode in a range of 12 gf/25 mm to 25 gf/25 mm.

* * * * *